(12) United States Patent
Elsinger (10) Patent No.: US 10,473,948 B2
(45) Date of Patent: Nov. 12, 2019

(54) OPTICAL HYBRID LENS AND METHOD FOR PRODUCING AN OPTICAL HYBRID LENS

(71) Applicant: ams AG, Unterpremstaetten (AT)

(72) Inventor: Lukas Elsinger, Graz (AT)

(73) Assignee: ams AG, Unterpremstaetten (AT)

( * ) Notice: Subject to any disclaimer, the term of this patent is extended or adjusted under 35 U.S.C. 154(b) by 40 days.

(21) Appl. No.: 15/739,673

(22) PCT Filed: Jun. 29, 2016

(86) PCT No.: PCT/EP2016/065187
§ 371 (c)(1),
(2) Date: Dec. 22, 2017

(87) PCT Pub. No.: WO2017/001508
PCT Pub. Date: Jan. 5, 2017

(65) Prior Publication Data
US 2018/0188553 A1    Jul. 5, 2018

(30) Foreign Application Priority Data
Jun. 30, 2015    (EP) .................................. 15174609

(51) Int. Cl.
*G02B 5/18*    (2006.01)
*G02B 27/42*    (2006.01)

(52) U.S. Cl.
CPC ........ *G02B 27/4211* (2013.01); *G02B 5/1809* (2013.01); *G02B 5/1814* (2013.01); *G02B 5/1895* (2013.01)

(58) Field of Classification Search
CPC .............. G02B 27/4211; G02B 5/1809; G02B 5/1814; G02B 5/1895; G02B 5/18
See application file for complete search history.

(56) References Cited

U.S. PATENT DOCUMENTS

| | | |
|---|---|---|
| 8,062,753 B2 | 11/2011 | Schreder et al. |
| 8,755,118 B2 | 6/2014 | Chang-Hasnain et al. |
| 2004/0114229 A1* | 6/2004 | Sakaguchi ........... G02B 5/0221 359/460 |
| 2009/0213262 A1 | 8/2009 | Singh et al. |

(Continued)

FOREIGN PATENT DOCUMENTS

| | | |
|---|---|---|
| JP | 2010-212625 A | 9/2010 |
| WO | 2012144997 A1 | 10/2012 |
| WO | 2014189507 A1 | 11/2014 |

OTHER PUBLICATIONS

Crabtree, K. et al.: "Subwavelength-grating-induced wavefront aberrations: a case study" Applied Optics, Optical Society of America, Washington, DC; US, vol. 46, No. 21; Jul. 20, 2007.

(Continued)

*Primary Examiner* — William R Alexander
*Assistant Examiner* — Balram T Parbadia
(74) *Attorney, Agent, or Firm* — Fish & Richardson P.C.

(57) ABSTRACT

An optical hybrid lens comprises a substrate having a first surface and a second surface opposite the first surface. A sub-wavelength grating lens is disposed on the first surface and comprises a plurality of posts. The plurality of posts is arranged on the first surface and the posts extend from the first surface. A refractive lens is arranged on the sub-wavelength grating lens at least partly enclosing the plurality of posts. Alternatively, the refractive lens is arranged on the second surface.

20 Claims, 6 Drawing Sheets

(56) References Cited

U.S. PATENT DOCUMENTS

| | | | | |
|---|---|---|---|---|
| 2010/0165134 | A1* | 7/2010 | Dowski, Jr. | B24B 13/06 348/218.1 |
| 2011/0181797 | A1* | 7/2011 | Galstian | G02F 1/133351 349/2 |
| 2012/0087007 | A1* | 4/2012 | Suganuma | G02B 5/1809 359/572 |
| 2012/0314292 | A1* | 12/2012 | Mathai | G02B 5/1809 359/575 |
| 2013/0241090 | A1* | 9/2013 | Sakamoto | G02B 1/118 264/1.7 |
| 2014/0044392 | A1* | 2/2014 | Fattal | G02B 5/1809 385/14 |
| 2015/0090862 | A1 | 4/2015 | Matsui et al. | |
| 2016/0077261 | A1* | 3/2016 | Arbabi | G02B 5/3025 359/493.01 |
| 2016/0282194 | A1* | 9/2016 | Barnett | H01L 35/32 |
| 2016/0301188 | A1* | 10/2016 | Mathai | H01S 5/18386 |

OTHER PUBLICATIONS

Kleemann, B.H. et al.: "Design concepts for broadband high-efficiency DOEs" Journal of the European Optical Society; Apr. 17, 2008, XP055300778, p. 1, right-hand column, paragraph 2 section 2.4; p. 11, paragraph 2.

Chang-Hasnain, C.J. et al.: "High-contrast gratings for integrated optoelectronics" Advances in Optics and Photonics, vol. 4, pp. 379-440; published Sep. 4, 2012.

Klemm, A. et al.: "Focusing with planar microlenses made of two-dimensionally varying high contrast gratings" Optical Engineering 53(9), 095104, Sep. 2014.

Vo, S. et al.: "Sub-wavelength grating lenses with a twist" IEEE Photonics Technology Letters, vol. 26, No. 13; Jul. 1, 2014.

Voelkel, R.:"Wafer-scale micro-optics fabrication" Adv. Opt. Techn., vol. 1, pp. 134-150, THOSS Media and De Gruyter; 2012.

Office Action issued in European Application No. 15174609.6, dated Apr. 9, 2019, 7 pages.

* cited by examiner

OPTICAL HYBRID LENS AND METHOD FOR PRODUCING AN OPTICAL HYBRID LENS

The present invention relates to an optical hybrid lens and to a method for producing an optical hybrid lens, in particular for producing an optical hybrid lens at wafer level.

BACKGROUND OF THE INVENTION

Optical sensors find ever increasing application in various devices like smartphones, tablets and other mobile devices. At the same time there is a constant demand to reduce size of these devices and optical sensor design needs to keep the pace.

Optical lenses are often indispensable elements to optical sensor design and are a major parameter defining the overall height of the sensor. There have been many attempts to reduce the height of optical lenses, such as using Fresnel lenses for example. However, the dimension of optical lenses cannot be arbitrarily reduced without losing optical quality. For example, because of the diffraction limit lenses cannot be made smaller without severely deteriorating resolution. Furthermore, size reduction may introduce unwanted optical aberrations such as chromatic and spherical aberration. In the past optical aberrations have been accounted for by hybrid structures comprising one or more refractive and diffractive lens elements. However, the resulting build height still leaves room for improvement.

Alternatively or in combination with the optical lenses, diffractive designs have been used in order to do reduce height. FIG. 5B shows the position of a focal spot on the focal plane for a purely diffractive design. The position relative to the focal plane (shown as a dashed line) is depicted on the X axis. A power flow in arbitrary units is depicted in the Y axis. Typically, the diffractive lens design is optimized for a given wavelength $\lambda$. Correspondingly in focus the highest power flow can be seen on the position of the focal plane. However at slightly different wavelengths, i.e. $0.85\lambda$ and $1.15\lambda$ the highest power flow is far away from the focal plane. This is a clear indication of chromatic aberration.

SUMMARY OF THE INVENTION

In one embodiment a hybrid optical lens comprises a substrate having a first surface and the second surface. The first and second surfaces are opposite to each other. A sub-wavelength grating lens is disposed on the first surface and comprises a plurality of posts. The plurality of posts is arranged on the first surface and extends from the first surface. A refractive lens is arranged on or below the sub-wavelength grating lens. In case the refractive lens is arranged on the sub-wavelength grating lens it at least partly encloses the plurality of posts.

The sub-wavelength grating is a grating whose period, for example, is between the wavelengths inside the grating material and its surrounding media. Different to common diffraction gratings the sub-wavelength grating is still subject to ongoing research and not all of its properties have been fully understood. For example, due to sub-wavelength size of its optical structures (such as periodicity) only the zeroth diffraction order carries energy in reflection and transmission, which are plane waves. Further properties include resonance phenomena and broadband reflection and transmission.

Light incident on the hybrid lens is focused onto a focal plane which is defined by an overall focal length of the hybrid lens. The wave-front of the incoming plane wave is reshaped by the lens according to its focal length. The sub-wavelength grating lens has a focal length which to a good degree of approximation has an inverse dependency on wavelength compared to the focal length of the refractive lens.

Consequently, the resulting focal length of the hybrid lens is less dependent on wavelength and results in a reduced wavelength dependence of the combined hybrid lens. This results in a better correction of chromatic aberrations and other types of optical aberrations such as spherical aberration. Furthermore, the proposed hybrid lens design allows for reduced build height as the height of the sub-wavelength grating lens can be kept rather small.

In another embodiment at least the first and/or second surface is planar.

In another embodiment at least the first and/or second surface is curved.

The shape of the substrate surface can be used to further define the optical properties of the hybrid optical lens. Thus, the surface does not necessarily have to be planar.

In another embodiment the refractive lens is designed to have a first focal length in a function of wavelength. The sub-wavelength grating lens is designed to have a second focal length been a function of wavelength as well. The wavelength dependency of the second focal length is adjusted to be the inverse of the wavelength dependency of the first focal length. The first and second focal lengths are defined with respect to a range of wavelengths to be transmitted by means of the optical hybrid lens.

The wavelength dependency of the respective focal lengths of refractive lens and sub-wavelength grating lens can be matched in order to compensate or cancel each other. At least to a first degree of approximation the resulting overall focal length of the hybrid lens is independent of wavelength. Higher terms can be included by careful designing the elements of the hybrid lens, for example, by using a stack of several refractive lenses, even made from differently refracting materials.

In another embodiment of the plurality of posts is arranged in one- or two-dimensional lattice. Distances between any pair of posts, defined as distances between centers of the respective posts, is smaller than half the wavelength of light to be transmitted by the optical hybrid lens.

In another embodiment the plurality of posts is arranged in a regular two-dimensional lattice geometry. In particular, the regular two-dimensional lattice geometry is a periodic two-dimensional lattice geometry.

In another embodiment the regular two-dimensional lattice geometry has triangular, rectangular, pentagonal, and hexagonal or any other of the polyangular shape.

In another embodiment with respect to one central post further groups of posts from the plurality of posts are arranged around the central post. All posts of one group of posts are arranged in regular cells and have the same diameter. The regular cells do not necessarily have be of equal shape.

In another embodiment the diameter of posts in the regular cells decreases or increases with distance from the central post. The decrease or increase is with respect to the diameter of the central post.

In another embodiment the plurality of posts is arranged in a non-regular two-dimensional lattice geometry. In particular the non-regular two-dimensional lattice geometry is a non-periodic two-dimensional lattice geometry.

In another embodiment the posts have a circular, elliptical, square, rectangular, triangular or irregular cross sectional shape.

In another embodiment the height of each post from the plurality of posts and to a respective center to center distance with respect to the most adjacent post is the same or is constant.

In an embodiment a method for producing an optical hybrid lens, in particular for producing an optical hybrid lens said wafer level, comprises the step of providing a substrate having a first surface and a second surface opposite the first surface. A sub-wavelength grating lens comprising a plurality of posts is disposed on the first surface. The plurality of posts is arranged on the first surface so that the posts extend from the first surface. Finally, a refractive lens is arranged on the sub-wavelength grating lens so that the lands at least partly encloses the plurality of posts. Alternatively, the refractive lens is arranged on the second surface opposite the first surface of the substrate.

In another embodiment the refractive lens is designed to have a first focal length being a function of wavelength. The sub-wavelength grating lens is designed to have a second focal length being a function of wavelength. Herein the wavelength dependency of the second focal length is adjusted to be the inverse of the wavelength dependency of the first focal length. The first and second focal length are defined with respect to a range of wavelength to be transmitted by means of the optical hybrid lens.

In another embodiment the arrangement of posts of the sub-wavelength grating is calculated by means of a numerical simulation.

A hybrid optical lens made from refractive/diffractive elements as introduces below allows for reduced build height and correction of chromatic aberrations. In the devised design, a sub-wavelength grating lens with a wavelength dependence on the focal length $fD(\lambda) \sim 1/\lambda$ and a refractive lens with an approximate wavelength dependence on the focal length $fR(\lambda) \sim \lambda$ can be combined at wafer-level.

The resulting hybrid lens then has a focal length fH with greatly reduced chromatic aberration. This enables the reduction of the integrated optics build height compared to a refractive design and eliminates severe chromatic aberrations, which are a main drawback of a purely diffractive design.

The use of a sub-wavelength grating lens in a hybrid design is not limited to correction of chromatic aberrations. Due to the ability to modify the transmitted phase at every point of the grating, correction for spherical aberration of the refractive element and more advanced lens designs can also be realized. Furthermore, sub-wavelength gratings can also be designed to work as polarization filters or notch/band pass filters.

BRIEF DESCRIPTION OF THE DRAWINGS

In the following, the concept presented above will be described in more detail with respect to drawings in which exemplary embodiments are presented.

DETAILED DESCRIPTION

Figure 1A:
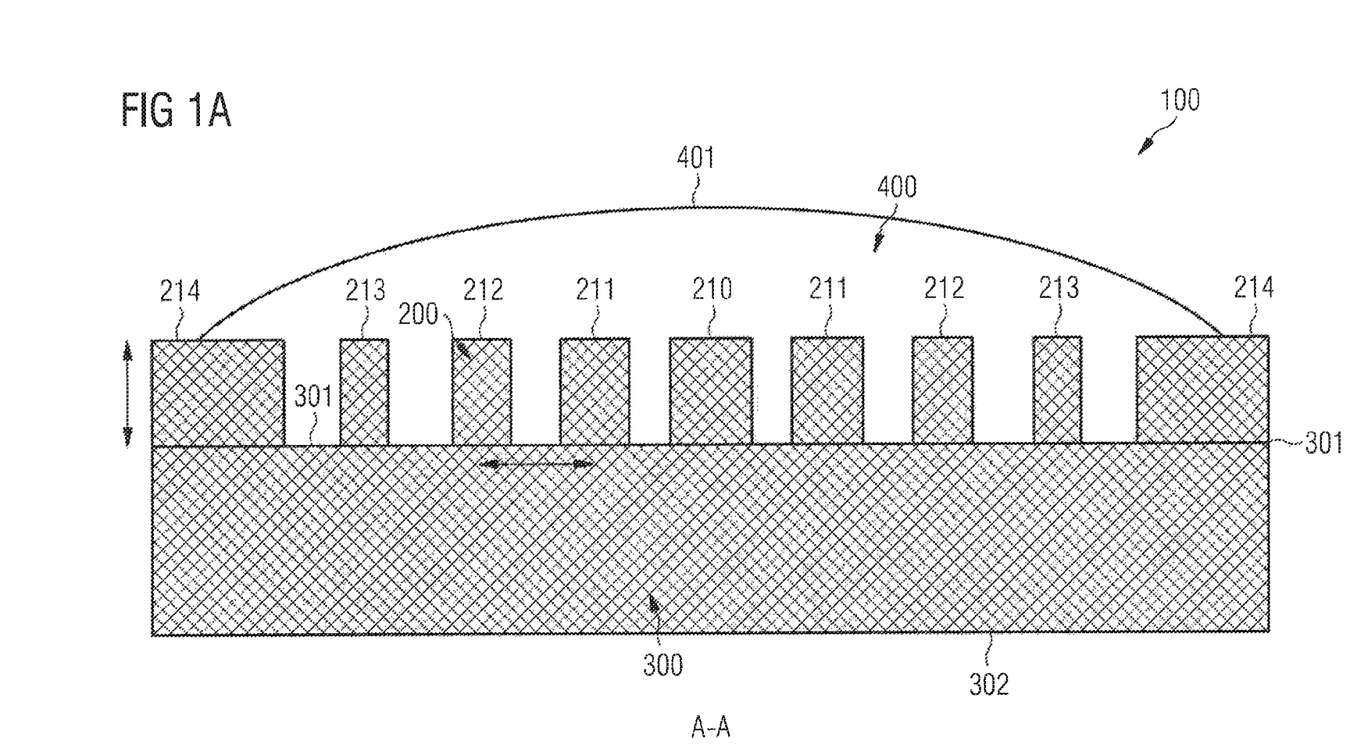
FIG. 1A shows a cross-section of an exemplary embodiment of a hybrid optical lens.

FIG. 1A shows a cross-section of an exemplary embodiment of a cross-section of a hybrid optical lens.

The drawing depicts a layout of a hybrid lens 100 comprising a stack of a sub-wavelength grating lens 200 disposed on a planar top surface 301 of a substrate 300, and a refractive lens 400 arranged on the sub-wavelength grating 200 and the substrate 300.

The sub-wavelength grating lens 200 is composed of a regular two-dimensional and rectangular-shaped lattice of cylindrical posts 210, 211, 212, 213 extending approximately perpendicular from the top surface 301. The cylindrical posts each have equal height. In the present embodiment the height of posts is 6.25 µm.

The cylindrical posts 210, 211, 212, 213 have a constant distance with respect to each other. In this embodiment any pair of cylindrical posts has a center-to-center distance of 5 µm. Thus, the lattice of posts is characterized by an equilateral rectangular unit cell with a lattice constant, denoted by Λ, that corresponds to the distance between the centers of any pair of adjacent posts, here 5 µm (see also FIG. 1B).

The hybrid lens 100 can be manufactured at the wafer level. This way several hybrid lenses can be produced at the same time and be diced into individual units.

The substrate 300 can be composed of a single elemental semiconductor, such as silicon, germanium or a compound semiconductor. The one choice of material is silicon, but higher transmission values for infrared radiation can be achieved by using a chalcogenide glass instead. Generally, the sub-wavelength grating 200 can be produced by means of conventional lithographic techniques either directly on the substrate 300 or from a layer of material deposited onto the substrate 300.

The refractive lens 100 covers the lattice of the sub-wavelength grating 200 and at least parts of the substrate 300 between the individual cylindrical posts. The height of the refractive lens 400 depends on the choice of materials as well as the desired quality of chromatic aberration correction and on the diameter of the refractive lens 400. Both the diameter of the hybrid lens 100 and the choice of materials affect the total transmitted intensity.

The refractive lens 400 can be molded on top of the sub-wavelength grating 200 by an imprint technique or be produced by lithography and a subsequent thermal reflow step. One possibility is to mold the lens from polyethylene, which could also be used for planarization of the sub-wavelength grating lens lattice of cylindrical posts.

An alternative option for the refractive lens is to etch into a planar surface 302 on the back-side of the substrate 300 and arrange the lens into the etched substrate. This allows for the sub-wavelength grating lens 200 to be on the top side of the optics stack, while also vacuum compatibility requirements of the back side of the optics stack can be fulfilled. Another option is to use an amorphous chalcogenide photoresist, which is brought into the form of a lens by either grayscale lithography or a reflow step subsequent to conventional lithography.

Figure 1B:
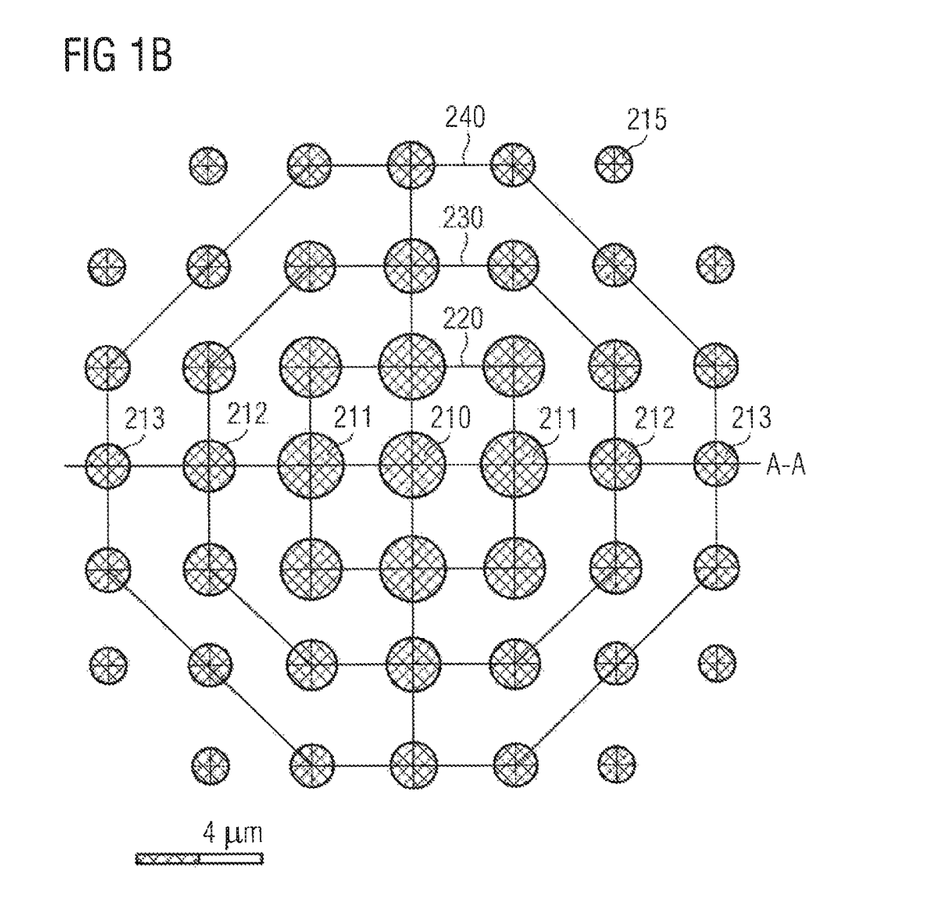
FIG. 1B shows a top view of an exemplary embodiment of a cross-section of a hybrid optical lens.

FIG. 1B shows a top view of an exemplary embodiment of a cross-section of a hybrid optical lens. The cross-section of FIG. 1A is depicted as a line A-A.

The diameters of the cylindrical posts vary radially from a center of the sub-wavelength grating lens towards an edge of the grating. In this particular embodiment at the center of the grating a central cylindrical post 210 is positioned having a diameter of 3.5 μm. A group of cylindrical posts 211 is arranged around the central cylindrical post 110 in a rectangular cell 220. The diameter of these cylindrical posts 211 is smaller compared to the central cylindrical post 210. A further group of cylindrical posts 212 is arranged in octagonal cell 230 around the central cylindrical post 210. Finally, a last group of cylindrical posts 213 is arranged in another octagonal cell 240 and has an even smaller diameter. Finally, posts 215 are arranged outside the octagonal cell 240 having yet smaller diameter. This diameter, in this particular embodiment, is 1.5 μm.

The diameters of the cylindrical posts vary between 30% and 70% of the center-to-center distance (fill factor). This results in a minimum feature size of 1.5 μm and a maximum aspect ratio of about 1:4 for this particular embodiment. The particular values of diameter, height and center-to-center distance of the cylindrical posts, or respective fill factors, are parameters of the sub-wavelength grating lens design and can be adjusted to meet specific design constraints, for example with respect to compensation of chromatic aberration the a hybrid stack with the refractive lens. The particular values and ratios can be determined by means of numerical simulation. In the present embodiment a design wavelength of 10 μm has been chosen and other parameters result from a numerical solution of the Maxwell equations within the constraints of the hybrid lens design.

Some embodiments have a design wavelength in the infrared regime. The design wavelength is chosen as 10 μm, as an example. The design, however, is not limited to the IR range and the concept discussed here can be adjusted to visual or UV spectral range as well. For different design wavelengths, adequate transmission of the substrate and post material must be ensured. The geometric dimensions of the posts scale proportional to the design wavelength.

Figure 2:
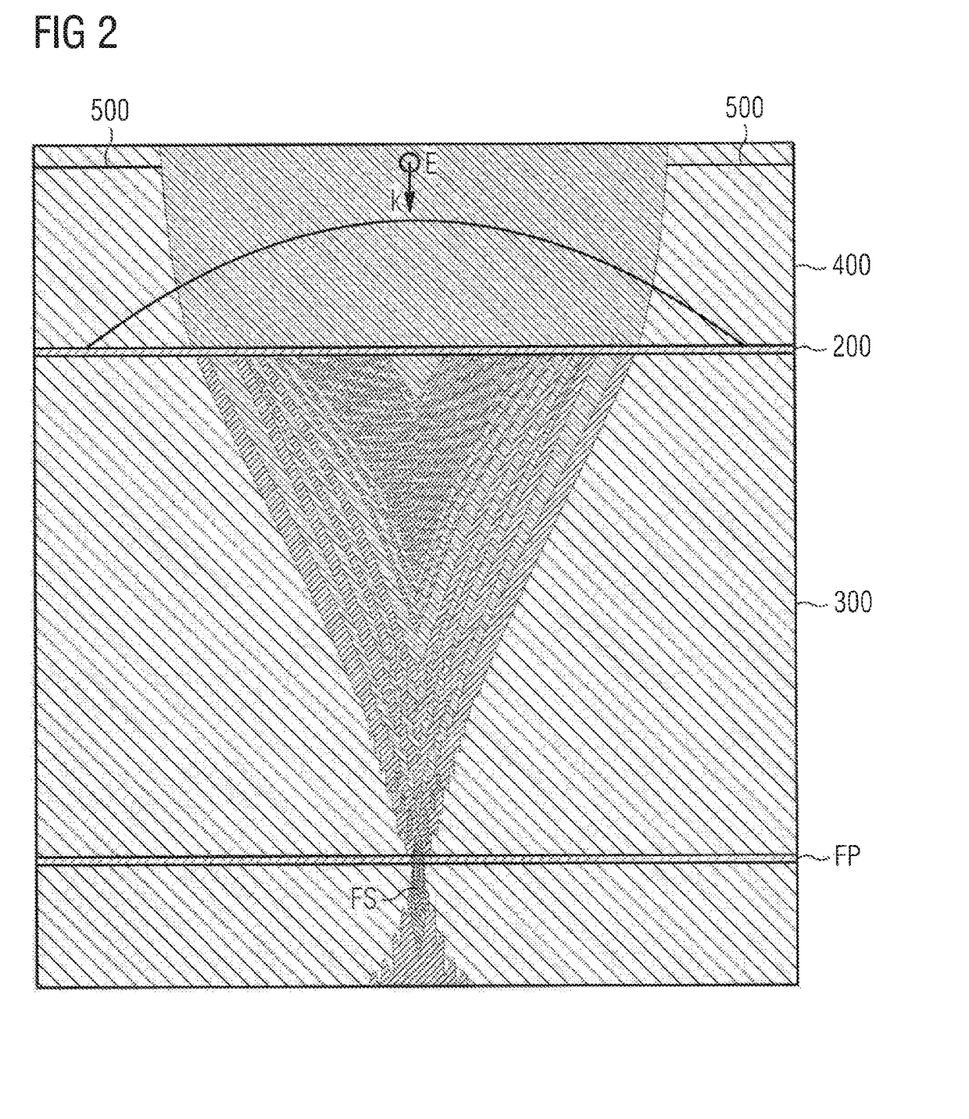
FIG. 2 shows a simulation of an exemplary embodiment of a hybrid optical lens.

FIG. 2 shows an exemplary simulation of an exemplary embodiment of a hybrid optical lens 100. In particular, the drawing illustrates a working principle of the hybrid lens 100 and is a result of a full wave-optic FEM simulation.

Depicted is the hybrid optical lens 100 comprising the refractive lens disposed on the sub-wavelength grating lens. Furthermore, an aperture 500 is arranged on the hybrid lens to limit incident light. Basically, the sub-wavelength grating 200 comprises the lattice of dielectric cylindrical posts made of a material with refractive index $n_G$ placed on the substrate 300 having a refractive index $n_S$.

Light incident on the hybrid lens 100 via the aperture 500 is focused onto a focal plane FP which is defined by the overall focal length $f_{HL}(\lambda)$ of the hybrid lens 100. In more detail, light first falls onto the refractive lens 400 with index $n_L$, which is strongly dependent on the wavelength λ. The wave-front of the incoming plane wave is reshaped by the curved surface 401 of the lens 400 with a wavelength dependence on the focal length $f_R(\lambda)$:

$$f_R(\lambda) \sim \lambda.$$

The focal length of the subsequent sub-wavelength grating 200 lens $f_D(\lambda)$ has a contrary wavelength dependence $$f_D(\lambda) \sim 1/\lambda.$$

In first order of approximation the resulting focal length $f_{HL}(\lambda)$ of the hybrid lens 100 is independent on wavelength λ. This results in a significantly reduced wavelength dependence of the combined hybrid lens 100. Thus, the proposed hybrid lens design allows for reduced build height and correction of chromatic aberrations.

The grayscale in the drawing represents the normalized energy transport (see also electric field vector E and wave vector k). FEM simulation shows a diffraction limited size of the focal spot FS for high numerical apertures. The sub-wavelength grating can be configured with a certain numerical aperture NA by the constraint $$\Lambda \leq \lambda/2 \cdot NA,$$

wherein Λ denotes the lattice constant.

Figure 3:
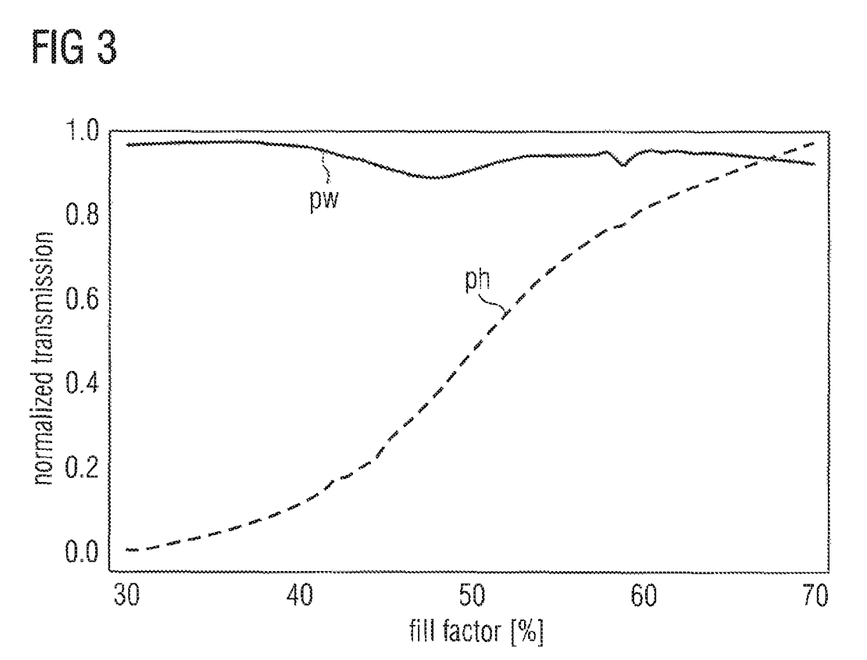
FIG. 3 shows a normalized transmission from a simulation of an exemplary sub-wavelength grating lens.

FIG. 3 shows normalized transmission from a simulation of an exemplary sub-wavelength grating lens 200.

On the X axis the graph depicts the fill factor of the cylindrical posts of the lattice. The fill factor corresponds to the ratio of post diameter to grating pitch. The Y axis shows the normalized transmission. Furthermore, two graphs are shown: power pw and phase ph.

The power pw transmitted by the sub-wavelength grating is greater than 90% for all fill factors between 30% and 70%. This is a notable improvement compared, for example, to a binary Fresnel zone plate used to in other optical sensor designs. Furthermore, the phase graph ph indicates that the transmitted phase can be changed in the range of 2π by varying the fill factor.

These results indicate that the use of the sub-wavelength grating lens 200 in the hybrid optical lens 100 is not limited to correction of chromatic aberrations. Due to the ability to modify the transmitted phase ph at every point of the grating 200 and, as a function of the fill factor, correction for the spherical aberration of the refractive lens and more advanced lens designs can also be realized. Furthermore, sub-wavelength gratings can also be designed to work as polarization filters or notch/band pass filters.

Another advantage of the sub-wavelength grating 200 compared to other diffractive elements is the reduced wavelength-dependence of the diffraction efficiency, since the sub-wavelength grating is designed to only allow transmission of diffraction order zero.

Figure 4:
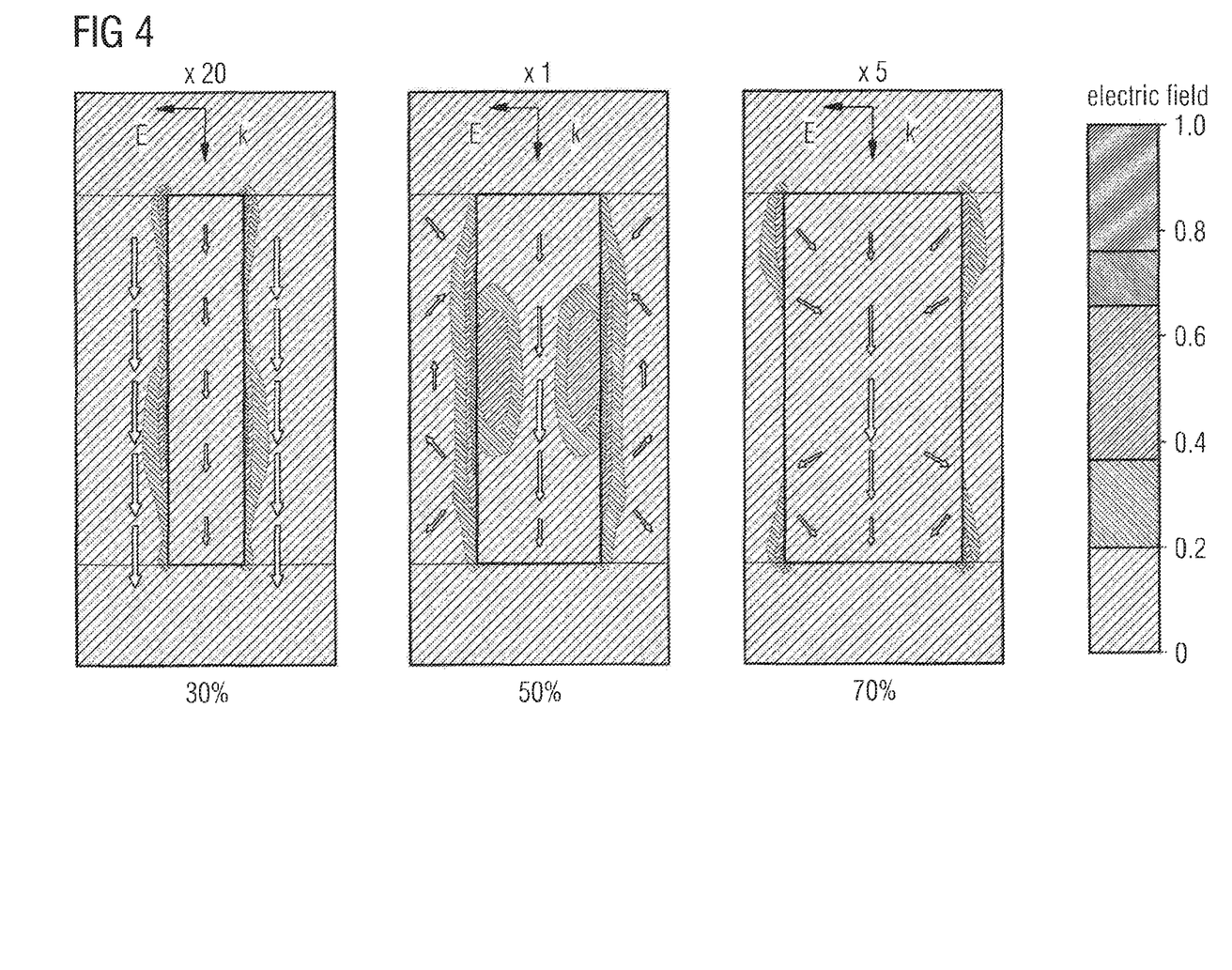
FIG. 4 shows a simulation of the electric field and energy transport inside an exemplary sub-wavelength gratings lens.

FIG. 4 shows a simulation of the electric field and energy transport inside an exemplary sub-wavelength grating lens 200.

The drawing illustrates the working principle of the transmissive sub-wavelength grating lens 200. Depicted is a single cylindrical post 216 on the substrate for fill factors of 30%, 50% and 70%, respectively. The electric field vector E and wave vector k are indicated. The magnitude of the electric field is shown via the greyscale scale and the magnitude of the Poynting vector is proportional to the length of the displayed arrows.

It is observed that for a fill factor of 30%, the electric energy is transported mainly by modes propagating through the air surrounding the post (see bold arrows outside the post). For a fill factor of 50% the energy transport is shifted to mode propagation inside the dielectric post which is indicated by bold arrows inside the post. This shift in mode propagation is accompanied by a phase change of 2π as shown above in FIG. 3. For better representation the views are magnified by 20×, 1×, and 5×, respectively.

Figure 5A:
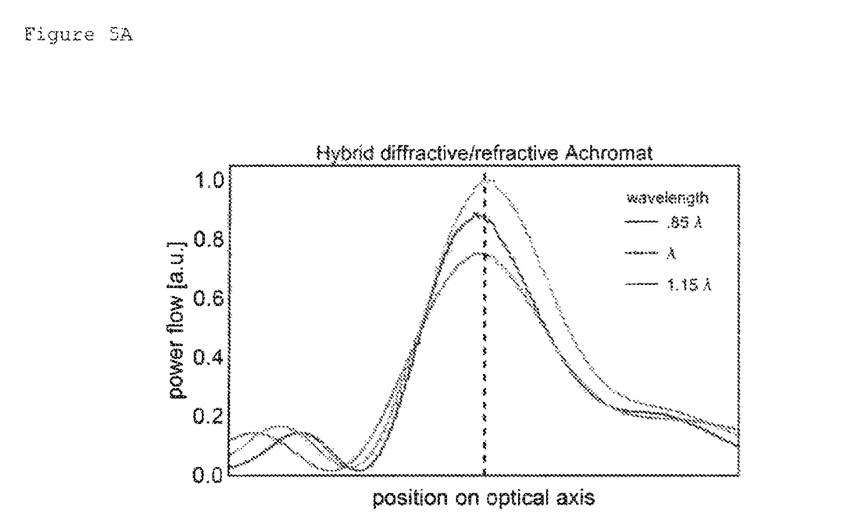
FIG. 5A shows a position of the focal spot on the focal plane of an exemplary hybrid optical lens as a function of wavelength.
Figure 5B:
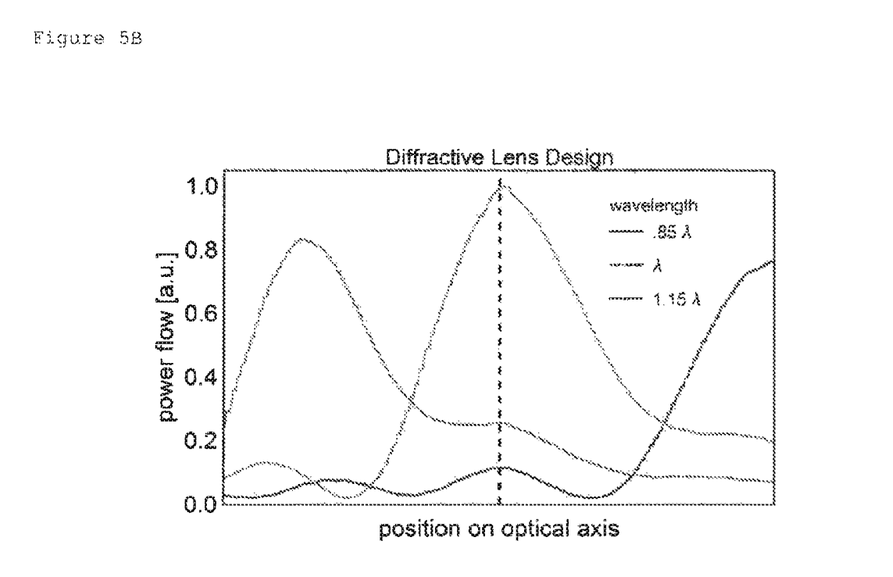
FIG. 5B shows a position of the focal spot on the focal plane of a purely diffractive lens design as a function of wavelength.

FIG. 5A shows a position of the focal spot on the focal plane of an exemplary hybrid optical lens. The position relative to the focal plane (shown as a dashed line) is depicted on the X axis. A power flow in arbitrary units is depicted on the Y axis.

This representation demonstrates the reduced wavelength dependence of the focal length of a hybrid optical lens design. The focal spot only moves marginally in the direction of the focal plane for the shown wavelengths, i.e. 0.85λ, λ, and 1.15. This is an indication of reduced chromatic aberration.

The invention claimed is:

1. An optical hybrid lens, comprising:
   a substrate having a first surface and a second surface opposite the first surface,
   a sub-wavelength grating lens disposed on the first surface and comprising a plurality of posts,
   the plurality of posts being arranged on the first surface and extending from the first surface, and
   a refractive lens arranged on the sub-wavelength grating lens at least partly enclosing the plurality of posts, or arranged on the second surface,
   wherein:
   the refractive lens has a first focal length that is a function of wavelength,
   sub-wavelength grating lens has a second focal length that is a function of wavelength, wherein a wavelength dependency of the second focal length is an inverse of a wavelength dependency of the first focal length, and
   wherein the first and second focal length are defined with respect to a range of wavelengths to be transmitted by the optical hybrid lens.

2. The optical hybrid lens according to claim 1, at least the first and/or second surface is planar.

3. The optical hybrid lens according to claim 1, at least the first and/or second surface is curved.

4. The optical hybrid lens according to claim 1, wherein the plurality of posts are arranged in a one- or two-dimensional lattice and
   distances between any pair of posts, defined as distances between centers of the respective posts, are smaller than half the wavelength of light to be transmitted by the optical hybrid lens.

5. The optical hybrid lens according to claim 4, wherein the plurality of posts are arranged in a regular two-dimensional lattice geometry, or arranged in a periodic two-dimensional lattice geometry.

6. The optical hybrid lens according to claim 5, wherein the regular two-dimensional lattice geometry has triangular, rectangular, pentagonal, hexagonal or any other polyangular shape.

7. The optical hybrid lens according to claim 4, wherein with respect to one central post, groups of posts from the plurality of posts are arranged around the central post in regular cells, wherein the posts from the plurality of posts arranged in a given regular cell have the same diameter.

8. The optical hybrid lens according to claim 7, wherein the diameter of posts from different regular cells decreases or increases with respect to the diameter of the central post as a function of distance to the central post.

9. The optical hybrid lens according to claim 4, wherein the plurality of posts are arranged in a non-regular two-dimensional lattice geometry, or are arranged in a non-periodic two-dimensional lattice geometry.

10. The optical hybrid lens according to claim 1, wherein the posts have a circular, elliptical, square, rectangular, triangular or irregular cross-sectional shape.

11. The optical hybrid lens according to claim 1, wherein the height of each post from the plurality of posts and center-to-center distance with respect to the most adjacent posts is equal.

12. A method for producing an optical hybrid lens at wafer level, comprising the steps of:
    providing a substrate having a first surface and a second surface opposite the first surface,
    disposing a sub-wavelength grating lens comprising a plurality of posts on the first surface,
    arranging the plurality of posts on the first surface so that the posts extend from the first surface,
    arranging a refractive lens on the sub-wavelength grating lens so that the refractive lens at least partly encloses the plurality of posts, or arrange the refractive lens on the second surface,
    configuring the refractive lens to have a first focal length that is a function of wavelength, and
    configuring the sub-wavelength grating lens to have a second focal length that is a function of wavelength,
    wherein:
    a wavelength dependency of the second focal length is adjusted to be an inverse of a wavelength dependency of the first focal length, and
    the first and second focal length are defined with respect to a range of wavelengths to be transmitted by the optical hybrid lens.

13. The method according to claim 12, wherein the arrangement of posts of the sub-wavelength grating is calculated based on a numerical simulation.

14. The method according to claim 12, wherein producing an optical hybrid lens comprising producing several optical hybrid lens at the same time, and dicing the several optical hybrid lens into individual units.

15. The method according to claim 12, wherein the sub-wavelength grating is produced by lithographic techniques either directly on the substrate or from a layer of material deposited onto the substrate.

16. The method according to claim 12, wherein the refractive lens is arranged on the sub-wavelength grating lens such that the refractive lens covers the lattice of the sub-wavelength grating and at least parts of the substrate between the individual cylindrical posts.

17. The method according to claim 12, wherein the refractive lens is molded on top of the sub-wavelength grating by an imprint technique or produced by lithography and a subsequent thermal reflow step.

18. The method according to claim 17, wherein the refractive lens is molded from polyethylene, and
    wherein the method further comprises performing a planarization of the sub-wavelength grating lens lattice of cylindrical posts using polyethylene.

19. The method according to claim 12, wherein the refractive lens is etched into a planar surface on a back-side of the substrate and arranged into the etched substrate.

20. The method according to claim 12, wherein the refractive lens is produced using an amorphous chalcogenide photoresist, which is brought into the form of a lens by either grayscale lithography or a reflow step subsequent to lithography.

* * * * *